(No Model.)
W. H. REIFF.
SPELLING PUZZLE.
No. 263,580. Patented Aug. 29, 1882.
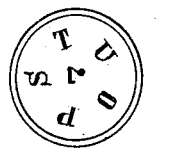
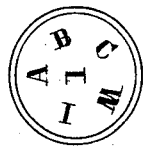
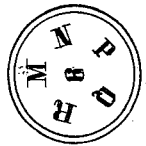
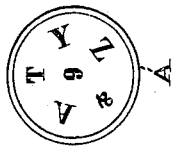
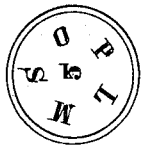
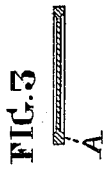
FIG. 3
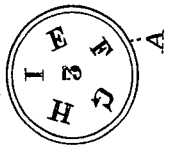
FIG. 2
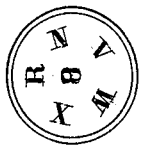
FIG. 1
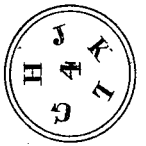
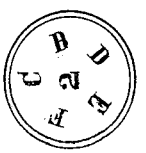
Witnesses
Thomas J. Bewley.
J. P. Ingram.
Inventor
William H. Reiff.
per Stephen Ustick, att'y

UNITED STATES PATENT OFFICE.

WILLIAM H. REIFF, OF PHILADELPHIA, PENNSYLVANIA, ASSIGNOR TO THOMAS R. BOONE, OF ROCHESTER, NEW YORK.

SPELLING-PUZZLE.

SPECIFICATION forming part of Letters Patent No. 263,580, dated August 29, 1882.

Application filed March 30, 1882. (No model.)

*To all whom it may concern:*

Be it known that I, WILLIAM H. REIFF, a citizen of the United States, residing at Philadelphia, in the county of Philadelphia and State of Pennsylvania, have invented a new and useful Improvement in Spelling-Puzzles, of which the following is a specification.

The nature of my invention will be understood by the following description.

In the accompanying drawings, which make a part of this specification, Figure 1 represents the face view of the tablets A, arranged in a row for spelling a word. Fig. 2 is an edge view of one of the tablets A. Fig. 3 is a cross-section through the center of a tablet.

Like letters of reference in all the figures indicate the same parts.

The puzzle consists of a number of tablets, A, made of any suitable material, having letters of the alphabet arranged on one of their flat sides, as shown in Fig. 1, and a numeral. The tablets are represented as having raised marginal edges, which are for the purpose of protecting the letters and numerals; but, if desired, they may be made perfectly plain or level on their flat surfaces. The number of tablets used in spelling a word is the same as the number of letters in the word. The numerals are used as a key for the arrangement of the tablets to spell the word. Thus for spelling the word "Christmas," which contains nine letters, nine tablets are used, in which one of the letters of each combines with letters of the others, when arranged in regular order to spell the word "Christmas;" and it being previously determined that the numerals 2 4 8 3 5 9 6 1 7 are on such tablets they are used as a key in spelling the word, the tablets being arranged consecutively, according to the numerals, in a row, and each turned around to bring the letters which spell the word in a regular row, as shown in Fig. 1. Any other word is spelled in the same manner, the number of tablets used, as above stated, being the same as the number of letters in the word. The tablets being flat, all the letters may be seen at a glance, thus avoiding the necessity of turning them about, which much facilitates the spelling of the word. This form also affords facility in manufacturing the puzzle and in making it neat and cheap.

In the drawings, the numerals are represented on the same side of the tablets as the letters, which avoids the necessity of turning them over in the arrangement for spelling the word, and the numeral of each tablet is shown in the center thereof; but, if desired, it may be in any other position, or on the reverse side.

This appears to be a very simple puzzle; but it is quite difficult to solve in spelling long words, and may be made very interesting to adults, as it admits of indefinite combinations. It may also be made interesting and amusing to children, and when used in spelling short words it may be rendered not only amusing but instructive to young children in learning to spell.

I claim as my invention—

The tablets A, having each certain letters of the alphabet and a numeral, the numerals to act as a key for the arrangement of the tablets to spell the words, substantially as described.

WILLIAM H. REIFF.

Witnesses:
 THOMAS J. BEWLEY,
 STEPHEN USTICK.